(12) United States Patent
Gajda et al.

(10) Patent No.: US 6,502,088 B1
(45) Date of Patent: Dec. 31, 2002

(54) METHOD AND SYSTEM FOR IMPROVED ACCESS TO NON-RELATIONAL DATABASES

(75) Inventors: Kimberly Lynn Gajda, Raleigh, NC (US); Bradley Allan Hess, Rockville, MD (US); Julie Anne Hill Kemp; Jerry Jay Lewis, both of Raleigh, NC (US); Robert Tod Thorpe, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/349,607

(22) Filed: Jul. 8, 1999

(51) Int. Cl.[7] .............................................. G06F 17/30
(52) U.S. Cl. ...................... 707/2; 707/1; 707/4; 707/10
(58) Field of Search .............................. 707/1–10, 101, 707/102, 104

(56) References Cited

U.S. PATENT DOCUMENTS

| | | | |
|---|---|---|---|
| 5,109,508 A | 4/1992 | Mitsumori et al. | 395/600 |
| 5,140,689 A | 8/1992 | Kobayashi | 395/575 |
| 5,146,590 A | 9/1992 | Lorie et al. | 395/600 |
| 5,280,612 A | 1/1994 | Lorie et al. | 395/600 |
| 5,335,343 A | 8/1994 | Lampson et al. | 395/575 |
| 5,379,419 A | 1/1995 | Heffernan et al. | 395/600 |
| 5,428,771 A | 6/1995 | Daniels et al. | 395/575 |
| 5,428,774 A | 6/1995 | Takahashi et al. | 395/600 |
| 5,432,930 A | 7/1995 | Song | 395/600 |
| 5,440,732 A | 8/1995 | Lomet et al. | 395/600 |
| 5,452,445 A | 9/1995 | Hallmark et al. | 395/600 |
| 5,455,946 A | 10/1995 | Mohan et al. | 395/600 |
| 5,495,609 A | 2/1996 | Scott | 395/600 |
| 5,550,965 A | 8/1996 | Gabbe et al. | 395/154 |
| 5,553,279 A | 9/1996 | Goldring | 395/600 |
| 5,561,797 A | 10/1996 | Gilles et al. | 395/600 |
| 5,581,756 A | 12/1996 | Nakabayashi | 395/602 |
| 5,603,024 A | 2/1997 | Goldring | 395/619 |
| 5,603,025 A | 2/1997 | Tabb et al. | 395/602 |
| 5,604,899 A | 2/1997 | Doktor | 395/603 |
| 5,630,114 A | 5/1997 | Serra et al. | 395/603 |
| 5,644,763 A | 7/1997 | Roy | 395/612 |
| 5,649,183 A | 7/1997 | Berkowitz et al. | 395/606 |
| 5,666,528 A | 9/1997 | Thai | 395/613 |
| 5,675,779 A | 10/1997 | Doktor | 395/604 |
| 5,680,607 A | 10/1997 | Brueckheimer | 395/607 |
| 5,680,610 A * | 10/1997 | Smith et al. | 707/10 |
| 5,696,960 A | 12/1997 | Bhargava et al. | 395/602 |

(List continued on next page.)

Primary Examiner—Kim Vu
Assistant Examiner—Anh Ly
(74) Attorney, Agent, or Firm—J. Bruce Schelkopf; Joseph A. Sawyer

(57) ABSTRACT

The method and system of the present invention provides improved access to databases in a computer system. The present invention includes a plurality of data sources, the data sources including at least one non-relational data source; a server coupled to the plurality of data sources, the server capable of providing client access to the plurality of data sources; and a store place data access layer (SPDAL) coupled to the server and the at least one non-relational data source, the SPDAL providing relational features to the at least one non-relational data source. In the preferred embodiment, the relational features provided include a two-phase commit process; a process for performing Structured Query Language (SQL) operations from within a single application; a referential integrity process; and a process for providing indices for non-relational data source files. These features allow the computer system to perform data changes across multiple database sources within a single operation; perform SQL operations from a single application across heterogeneous file systems; provide referential integrity of data in both relational and non-relational databases; and perform ad-hoc queries of data and other queries efficiently in non-relational databases. By adding these features, significant flexibility is added to the computer system.

20 Claims, 23 Drawing Sheets

U.S. PATENT DOCUMENTS

| | | | |
|---|---|---|---|
| 5,713,014 A | 1/1998 | Durflinger et al. | 395/604 |
| 5,729,733 A | 3/1998 | Sharif-Askary | 395/608 |
| 5,737,736 A | 4/1998 | Chang | 707/102 |
| 5,745,896 A | 4/1998 | Vijaykumar | 707/100 |
| 5,749,079 A | 5/1998 | Yong et al. | 707/100 |
| 5,758,145 A | 5/1998 | Bhargava et al. | 395/602 |
| 5,761,494 A | 6/1998 | Smedley et al. | 395/604 |
| 5,764,949 A * | 6/1998 | Huang et al. | 707/102 |
| 5,764,973 A | 6/1998 | Lunceford et al. | 395/601 |
| 5,768,577 A * | 6/1998 | Kleewein et al. | 707/10 |
| 5,781,910 A * | 7/1998 | Gostanian et al. | 707/201 |
| 5,918,225 A * | 6/1999 | White et al. | 707/3 |
| 5,924,074 A * | 7/1999 | Evans | 707/1 |
| 5,970,490 A * | 10/1999 | Morgenstern | 707/10 |
| 5,987,465 A * | 11/1999 | Kleewein et al. | 707/10 |
| 6,088,694 A * | 7/2000 | Burns et al. | 707/8 |
| 6,161,103 A * | 12/2000 | Rauer et al. | 707/4 |

* cited by examiner

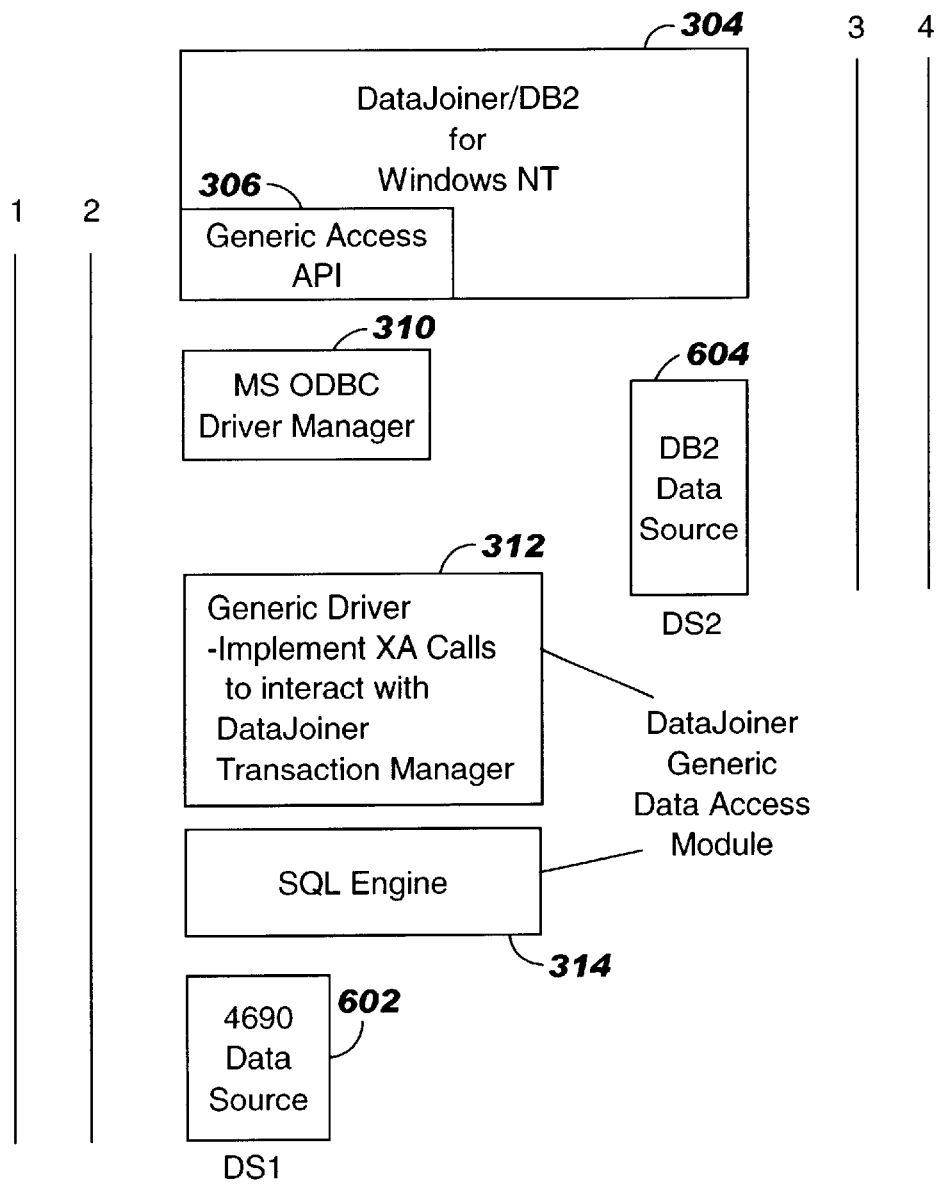

FIG. 6

End User Query Requiring Update to Multiple Data Sources
Using Two-Phase Commit

1-Transaction Manager (TM) tells 4690 Keyed File (DS1) debit $1000
2-DS1 replies and waits
3-TM tells DB2 Data Source (DS2) to credit $1000
4-DS2 replies and waits - End of Phase 1 of Two-Phase Commit
5-If either DS1 or DS2 indicate that they are unable to make update transaction fails and TM moves on to next transaction
6-if both DS1 and DS2 indicate they are able to make update then TM tells both to make update - End fo Phase 2 of Two-Phase Commit

FIG. 7 - 1

TABLE 1
Logical Entity Table

| Keyword | Short Description | DJ Data Type | Acceptable Values |
|---|---|---|---|
| LogicalEntityName | The name of the logical entity | varchar(254) | No restrictions |
| LogicalEntityID | SPDAL generated numeric unique identifier for this LogicalEntityName. Used for SPDAL operations only. | integer | Used by SPDAL internal operations only, the customer should not modify. |
| Description | A description of the LogicalEntity that is meaningful to the customer. This is not directly used by SPDAL. | varchar(4096) | No restrictions. Not used by SPDAL. |

TABLE 2
Physical Entity Table

| Keyword | Short Description | DJ Data Type | Acceptable Values |
|---|---|---|---|
| PhysicalEntityID | SPDAL generated numeric unique identifier for this PhysicalName. Used for SPDAL operations only | integer | Used by SPDAL internal operations only, the customer should not modify. |
| LogicalEntityID | SPDAL generated numeric unique identifier for this LogicalEntityName. This column is used to map back to the LogicalEntity table. Used for SPDAL operations only | integer | Used by SPDAL internal operations only, the customer should not modify. |

FIG. 7 - 2
TABLE 2 (contd.)
Physical Entity Table

| | | |
|---|---|---|
| PhysicalName | Fully qualified name of RDB table or file name without path specification. The PhysicalName could be 4690 or DDS logical name. For files this includes the file name and extension. | varchar(128) | This is used by the IP only, thus each name must adhere to OS, DDS, 4690, and RDB rules and is dependent on the data store. SPDAL can't verify these restrictions prior to SQL statements. |
| PhysicalPathName | Used for 4690 or DDS files only. This is the driver letter and path name without the file name and extension. | varchar(254) | This is used by the IP only, thus the value must adhere to OS, 4690, and DDS rules and is dependent on the data store. SPDAL can't verify these restrictions prior to SQL statements. This can be NULL. |
| DefinedInPhysical EntityID | This PhysicalEntityID has been defined by another PhysicalEntityID. This is used when multiple physical files have similar physical definitions that are in this table. The underlying file structure, for example as defined in the Attributes table, must be identical. This column is provided as a metadata administration convenience and is not required. This is for 4690 and DDS files only. | integer | Must be an existing PhysicalEntityID. May be NULL. |
| ServerName | Name of software physical entity providing the data access. This is the server name needed to create the DJ neckname. For RDB this represents a machine on the LAN that will provide the data source. For 4690 and DDS this is a fixed value that directs DataJoiner processing to the correct local ODBC driver. | varchar(50) | Discrete Values: DataJoiner, Oracle, Informix, Sybase, SQLServer, 4690Key, 4690Dir, 4690Seq, DDSKey, DDSBin, DDSSEq. |

FIG. 7 - 3
TABLE 2 (contd.)
Physical Entity Table

| | | |
|---|---|---|
| ServerName | Name of software physical entity providing the data access. This is the server name needed to create the DJ nickname. For RDB this represents a machine on the LAN that will provide the data source. For 4690 and DDS this is a fixed value that directs DataJoiner processing to the correct local ODBC driver. | varchar(18) | Valid DB2 long identifier. For 4690 this is '4690' for DDS this is 'DDS.' |
| NodeName | This is required for 4690 and DDS only. For 4690 this contains the RCO controller nodename that contains the physical file. For DDS this contains the nodename or rolename that contains the physical file. | varchar(50) | Should be NULL for RDBs. For 4690, this must be ADXLX'nnN' where nn can be 'CC' through 'ZZ'. For DDS this must be a valid DDS nodename or rolename. A nodename can be 1 to 8 characters, rolename is 1 to 8 characters encapsulated within <>, for example <rolename>. |
| KeySize | Number of bytes of a keyed record that comprises the key. Valid for 4690 and DDS only. | integer | DDS and 4690 must be >0 and <= RecordSize. |
| NumberOfBlocks | Number of blocks to be allocated for a keyed file. Valid for 4690 and DDS only. | integer | Must be greater than RandomizingDivisor and >=2. |
| BlockSize | The number of bytes to be allocated per block for a keyed file. Valid for DDS only. | integer | A multiple of 512 to 4096 and must be >= RecordSize + 4. |

FIG. 7 - 4
TABLE 2 (contd.)
Physical Entity Table

| | | |
|---|---|---|
| RandomizingDivisor | integer | DDS must be < NumberOfBlocks, can be 0 (system generated default is used). 4690 must be > 0 and < NumberOfBlocks. |
| ChainThreshold | integer | DDS must < NumberOfBlocks. 4690 1 to 255. |
| HashingAlgorithm | smallint | 0 = PolyNomial, 1 = XOR Rotation, 2 = Simple Folding. |
| OwnerName | varchar(128) | Must be NULL for DDS and 4690. For RDB must be DataJoiner Remote Identifier. |
| ODBCData | varchar(254) | For use by SPDAL only, customer should not modify. |
| SQLSupport | varchar(128) | See note below for list of acceptable discrete values. |
| DJNickname | char(30) | Max 8 characters with a . followed by a max of 18 characters. |
| AllowCreate | smallint | 0 = No, 1 = Yes. |

Row descriptions (first column detail):
- RandomizingDivisor: Randomizing divisor for the file. This determines how the records are dispersed in the file. Valid for 4690 and DDS only.
- ChainThreshold: The chaining threshold for the file. This is the number of sectors that are checked to find a keyed record before a warning is sent that the file is becoming inefficient. Valid for 4690 and DDS only.
- HashingAlgorithm: Indicates which hashing algorithm to be used. Valid for 4690 and DDS only.
- OwnerName: The ID of the owner of the RDB table. Not used with 4690 and DDS. Used with the DataJoiner Create Nickname call.
- ODBCData: For use by SPDAL only.
- SQLSupport: List of what SQL operations are supported for this 4690 or DDS file.
- DJNickname: The DataJoiner Nickname used for this physical file/table name
- AllowCreate: Indicate if SPDAL is allowed to Create this physical file. This is for 4690 and DDS only.

FIG. 7 - 5
TABLE 2 (contd.)
Physical Entity Table

| | | |
|---|---|---|
| AllowDelete | Indicate if SPDAL is allowed to Delete this physical file. This is for 4690 and DDS only. | smallint | 0 = No, 1 = Yes. |
| DDFrequency | The data distribution frequency for this physical file. This is for 4690 and DDS only. | smallint | 0 = distribute on update, 1 = distribute on close, 2 = no data distribution. These are consistent for DDS and 4690. |
| DDDomain | The data distribution domain (the set of nodes that receive the file updates) for this physical file. This is for 4690 and DDS only. | smallint | 0 = mirrored, 1 = broadcast/compound. May be NULL. |
| BcastDomainName | The name of the broadcast domain. This is valid for DDS only. | char(10) | Must be <= 9 characters. Set to NULL if DDDomain = mirrored or is NULL. |
| FileLock | The type of file level lock that will be attempted for each SQL statement when SPDAL opens the file. This is for DDS only. | smallint | 0 = FDS_FILE_LOCK_EXCLUSIVE, 1 = FDS_FILE_LOCK_SHARED, 2 = FDS_FILE_LOCK_NONE |
| Remarks | Description of the file | varchar(254) | No restriction, this field is not used by SPDAL directly. The customer can provide meaningful data if they want. This field can be NULL. |

FIG. 7 - 6
TABLE 3
Record Description Table

| Keyword | Short Description | DJ Data Type | Acceptable Values |
|---|---|---|---|
| EntityID | SPDAL generated numeric unique identifier for this physical file name. Used for SPDAL operations only. | integer | Used for SPDAL only, the customer should not modify. |
| RecordID | SPDAL generated numeric unique identifier for this RecordType. Used for SPDAL operations only | integer | Used for SPDAL only, the customer should not modify. |
| RecordName | The name of the record that uniquely identifies the record format. | varchar(254) | Identifier that is meaningful to the customer of what the record is used for. |
| AttributeID | The ID for the attribute whose value uniquely identifies the record. This is only used for sequential and binary files when multiple record types can be specified. | integer | Used for SPDAL only, the customer should not modify. |
| AttributeIDFieldValue | The value within the AttributeID that uniquely identifies the record. This is only used for sequential and binary files where multiple record types can be specified. | vachar(32) | Customer generated and must be unique for each RecordName within each PhysicalEntity. |
| RecordSize | Number of bytes of the record. For a keyed file there can only be one record type. For sequential and binary files there may be one or more record types. | integer | DDS>=KeySize and <=(BlockSize - 4). 4690 1 to 508. For sequential binary files on both 4690 and DDS it must be >= 1, and < size of the file. This is essentially a read-only field, this will be calculated by SPDAL based on the values in the Attribute table. |

FIG. 7 - 7
TABLE 4
Attribute

| Keyword | Short Description | DJ Data Type | EntityID |
|---|---|---|---|
| EntityID | SPDAL generated numeric unique identifier for this physical file name. Use for SPDAL operations only. This is used for 4690 and DDS only. | integer | Used for SPDAL only, the customer should not modify |
| RecordID | SPDAL generated numeric unique identifier for this RecordType. Used for SPDAL operations only. This is used for 4690 and DDS only. | integer | Used for SPDAL only, the customer should not modify. |
| AttributeID | SPDAL generated numeric unique identifier for this Attribute. Used for SPDAL operations only. This is used for 4690 and DDS only. | integer | Used for SPDAL only, the customer should not modify. |
| LogicalAttributeName | The logical name of this attribute. This name uniquely identifies this attribute. | char(128) | No restriction |
| PhysicalAttributeName | The physical name of this attribute. | varchar(18) | No restriction. This value should be NULL for 4690 and DDS. This is restricted to a DB2 long identifier. |
| StoredDataType | The data type used to store this attribute in DDS and 4690. | varchar(50) | A valid ODBC datatype, currently SPDAL supports ODBC 2 data types. The exact data types supported depend on DataJoiner ODBC support. The integer values to represent data types will be based off of OA. |

FIG. 7 - 8
TABLE 4 (contd.)
Attribute

| | | |
|---|---|---|
| PrimaryKey | Indicates if this attribute is involved with the primary key, which uniquely identifies a record. | smallint | 0 = No, 1 = yes |
| PositionInPrimaryKey | The position, starting with 1 for the first attribute, that this attribute occupies in the primary or foreign key. This is for DDS and 4690 only. | smallint | No restriction. |
| Offset | The starting byte position within the record. | integer | No restriction. |
| BitOffset | The bit offset into a field. This is just for support of bit manipulation, for example, INDICAT fields on 4690. | smallint | No restriction. |
| MinimumValue | The smallest acceptable value. Applicable for numeric fields only. | Decimal(31,5) | No restriction. This can be a negative number. For 4690 applications, 2 digits after the decimal point are supported. |
| MaximumValue | The largest acceptable value. Applicable for numeric fields only. | Decimal(31,5) | No restriction. This can be a negative number. For 4690 applications, 2 digits after the decimal point are supported. |
| DefaultValue | Value used if attribute omitted on API call. For example, an INSERT without values specified for each column/field. This is only used for 4690 and DDS. | varchar(254) | No restriction. The value will always be provided in character form and SPDAL will convert it to the proper StoredDataType. |
| NullsAllowed | Indicates if NULL values can be used for this attribute. This is only used for 4690 and DDS. | smallint | 0 = No, 1 = Yes |

FIG. 7 - 9
TABLE 4 (contd.)
Attribute

| | | |
|---|---|---|
| ValueOfNULL | varchar(30) | No restrictions. The value will be specified as character and SPDAL will convert it to the proper StoredDataType. |
| ValueOfTRUE | varchar(30) | No restriction. The value will be specified as character and SPDAL will convert it to the proper StoredDataType. |
| ValueOfFALSE | varchar(30) | No restriction. The value will be specified as character and SPDAL will convert it to the proper StoredDataType. |
| UniqueValueRequired | smallint | 0 = No, 1 = Yes |
| CharLength | integer | No restriction. For all data types other than char and varchar it is set to NULL. |
| Precision | integer | For CHAR or VARCHAR, must be set to same value as CharLength. For NUMERIC it is the number of total digits. For any other data type it is set to NULL since it is hardcoded. |
| Radix | integer | NULL |
| Scale | integer | No restriction for NUMERIC, NULL for all other data types. |

Row descriptions (middle column):
- ValueOfNULL: Indicates the value that represents a NULL. This is only used for 4690 and DDS.
- ValueOfTRUE: Indicates the value that represents TRUE. This is only used for 4690 and DDS.
- ValueOfFALSE: Indicates the value that represents FALSE. This is only used for 4690 and DDS.
- UniqueValueRequired: Indicates if the values of this attribute within the physical entity must all be unique. This is only used for 4690 and DDS.
- CharLength: Maximum length for character data types. This is only used for 4690 and DDS.
- Precision: Number of digits of mantissa precision. This is only used for 4690 and DDS.
- Radix: Reserved for future use. This is only for 4690 and DDS.
- Scale: Total number of significant digits to the right of the decimal point. This is only for 4690 and DDS.

FIG. 7 - 10
TABLE 4 (contd.)
Attribute

| | | | |
|---|---|---|---|
| Scope | Reserved for future use. This is only for 4690 and DDS. | smallint | NULL |
| AcessData | Used by SPDAL only, not set by the customer. This is only for 4690 and DDS. | varchar(254) | Not available for customer use. |
| ParentEntityID | Used to identify the parent attribute of this subattribute. This column should only be set if BitOffset is set, meaning that this row describes bit data within a parent attribute. This is a recursive table lookup. | integer | Used for SPDAL only, the customer should not modify. |
| ParentRecordID | Used to identify the parent attribute of this subattribute. This column should only be set if BitOffset is set, meaning that this row describes bit data within a parent attribute. This is a recursive table lookup. | integer | Used for SPDAL only, the customer should not modify. |
| ParentAttributeID | Used to identify the parent attribute of this subattribute. This column should only be set if BitOffset is set, meaning that this row describes bit data within a parent attribute. This is a recursive table lookup. | integer | Used for SPDAL only, the customer should not modify. |
| Remarks | Any user description of the use of the column. SPDAL does not use this field. | varchar(254) | No restriction. |

FIG. 7 - 11
TABLE 5
Valid Attribute Values Table

| Column Name | Short Description | DJ Data Type | Acceptable Values |
|---|---|---|---|
| EntityID | SPDAL generated numeric unique identifier for this physical file name. Used for SPDAL operations only. Used for DDS and 4690 only. | integer | Used for SPDAL only, the customer should not modify. |
| Record ID | SPDAL generated numeric unique identifier for this RecordType. Used for SPDAL operations only. Used for DDS and 4690 only. | integer | Used for SPDAL only, the customer should not modify. |
| AttributeID | SPDAL generated numeric unique identifier for this Attribute. Used for SPDAL operations only. Used for DDS and 4690 only. | integer | Used for SPDAL only, the customer should not modify. |
| ValidValue | One of the discrete valid values that may be specified by the calling application for this attribute. | varchar(254) | No restriction. The value is specified as character, SPDAL will convert it to the proper StoredDataType. |

FIG. 7 - 12
TABLE 6
Foreign Key Table

| Column Name | Short Description | DJ Data Type | Acceptable Values |
|---|---|---|---|
| ForeignKeyName | Gives a name to the relationship described. | varchar(18) | Must adhere to DB2 long identifier rules. |
| ParentEntityID | PhysicalEntityID name of the table or file that contains the parent side of the relationship. | integer | Used for SPDAL only, the customer should not modify. |
| ChildEntityID | PhysicalEntityID table or file that contains the child side of the relationship | integer | Used for SPDAL only, the customer should not modify. |
| ForeignKeyAttributes | List of the AttributeID that comprise the foreign key in the order they are defined in the primary key of the parent record. | varchar(128) | Must be a list of AttributeID that correspond to the same data types and order as the Primary key in the parent table. |
| DeleteRule | Defines the handling of foreign keys (child) upon the delete of the primary key (parent) | integer | NULL for SPDAL R1. For SPDAL R2 0 = Restrict, 1 = Cascade, 2 = set, NULL. |
| UpdateRule | Defines the handling of foreign keys (child) upon the update of the primary key (parent) | integer | NULL for SPDAL R1. |

FIG. 7 - 13
TABLE 7
Index Table

| Column Name | Short Description | DJ Data Type | Acceptable Values |
|---|---|---|---|
| IndexID | SPDAL generated numeric unique identifier for this index name. Used for SPDAL operations only. Used for 4690 and DDS only. | integer | No restriction. This is set by SPDAL and should not be altered by the customer. |
| PhysicalEntityID | SPDAL generated numeric unique identifier for this physical file name. Used for SPDAL operations only. Used for 4690 and DDS only. | integer | Used for SPDAL only, the customer should not modify. |
| RecordID | SPDAL generated numeric unique identifier for this RecordType. Used for SPDAL operations only. | integer | Used for SPDAL only, the customer should not modify. |
| AttributeID | SPDAL generated numeric unique identifier for this Attribute. Used for SPDAL operations only. | integer | Used for SPDAL only, the customer should not modify. |
| SequenceInIndex | Order in which this attribute appears in the index. | smallint | For SPDAL R1, this is fixed at 1, the customer should not modify. |
| IndexName | A descriptive name of the index. | varchar(255) | This is used by the Index Manager, thus the value must adhere to OS file naming rules and is dependent on the data store. SPDAL can't verify these restrictions prior to creating the index file. |
| UniqueIndicator | Indicates if unique values are required for the index field | smallint | 0 = No, 1 = Yes |

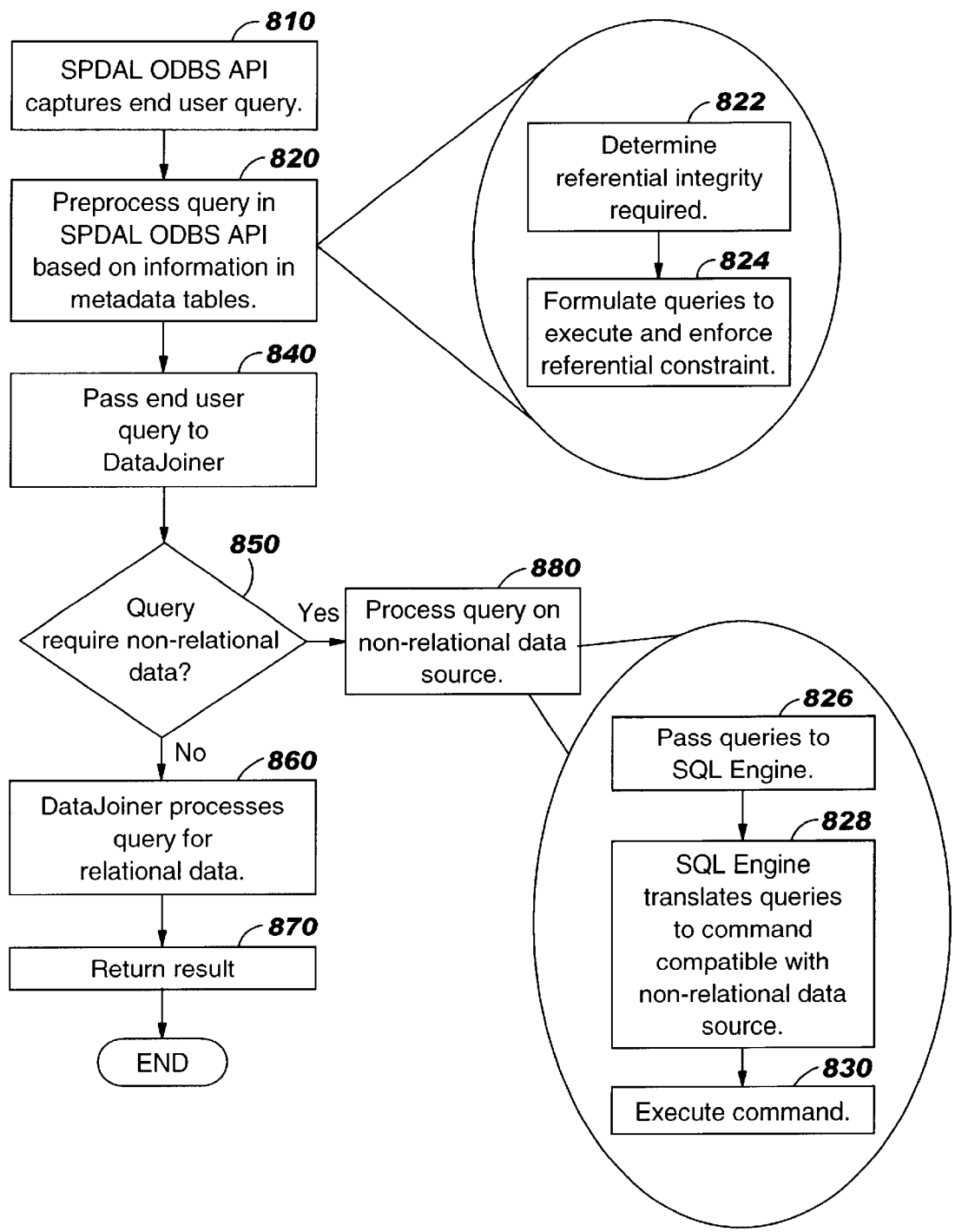

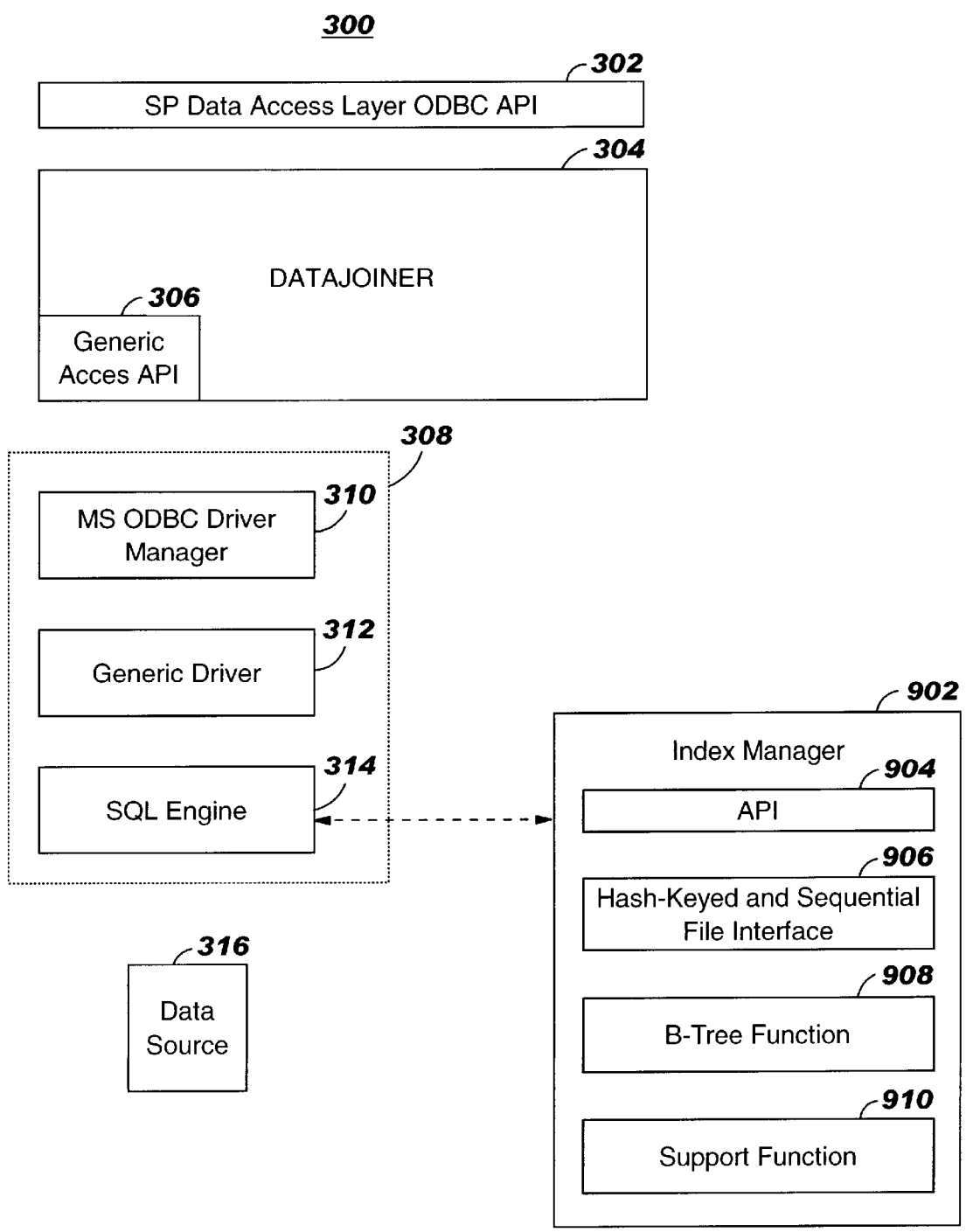

METHOD AND SYSTEM FOR IMPROVED ACCESS TO NON-RELATIONAL DATABASES

FIELD OF THE INVENTION

The present invention relates to computer systems, and more particularly to the access of databases in the computer system.

BACKGROUND OF THE INVENTION

Databases are an important tool for the storage and management of information for businesses. Both relational and non-relational databases exist for this purpose. Examples of relational databases include ORACLE, DB2, AND INFORMIX. Examples of non-relational databases include custom databases created with the 4690 operating system, developed by INTERNATIONAL BUSINESS MACHINES CORPORATION. The 4690 operating system allows programmers to created custom databases which support keyed, sequential, and binary file types. Database Management Systems (DBMS) provide users the capabilities of controlling read/write access, specifying report generation, and analyzing usage.

Some businesses, particularly large organizations, maintain multiple database types, both relational and non-relational. The simultaneous access to these databases then becomes an issue. For example, a company may wish to combine and compare customer preference information in the marketing department's ORACLE database with the current customer issues tracked in the customer service department's DB2 database. One conventional way of accessing these databases is through the DB2 DATA-JOINER ("DataJoiner") products, developed by INTERNATIONAL BUSINESS MACHINES CORPORATION. DataJoiner is a multi-database server which uses the Structured Query Language (SQL) and Open Database Connectivity (ODBC), to provide client access to diverse data sources that reside on different platforms.

FIG. 1 illustrates a computer system which uses DataJoiner. The computer system 100 comprises clients 102 in various platforms, a DataJoiner server 104, and data sources 106 of various types. The Data Joiner server 104 allows the clients 102 to transparently access data from the different data sources 106.

FIG. 2 is a block diagram illustrating the basic architecture of DataJoiner. DataJoiner 202 is a DBMS which includes ODBC software and drivers for a variety of data sources. DataJoiner 202 allows for transparent access to multiple data sources in a heterogeneous environment. The Generic Access Applications Programming Interface (API) 204 allows for customized access to home-grown or other data sources 208 not already supported by DataJoiner. Generic Data Access Modules 206 containing Custom ODBC compliant drivers for these data sources may be written and installed on the same system as DataJoiner 202 and used by DataJoiner 202 to access the data sources 208. The Generic Access API 204 defines the calls which must be provided by the custom ODBC drivers in order for DataJoiner 202 to access the custom data source 208.

However, DataJoiner is not able to provide certain features for access to the non-relational databases. In particular, DataJoiner 202 does not provide (1) a two-phase commit, (2) performance of SQL operations from within a single application across heterogeneous file systems, (3) referential integrity, and (4) indices for queries across heterogeneous file system which include non-relational data sources, such as 4690 keyed, sequential, and binary file systems.

Two-Phase Commit

DataJoiner can perform data changes across multiple databases sources within a single operation, while guaranteeing that changes to one source can be rolled back if changes to another source within the same transaction fail. The two-phase commit is the mechanism for implementing this. For example, someone may be trying to wire some money electronically to another location. A debit would need to be written against one account maintained by a first DBMS, and a credit would have to be reflected in another account maintained by a second DBMS. The two-phase commit protocol ensures that either all of the DBMS involved commit the changes required by the transaction or none do. However, keyed, sequential, and binary file systems cannot participate in this function.

SQL Operations from within a Single Application

Conventional relational DBMS's employ two underlying data storage concepts in order to facilitate relational operations on that data: (1) data is stored in tables with each table having a fixed number of columns; and (2) system catalogs, or data dictionaries, are generated for each table. These data dictionaries (metadata) describe the column layout, index structure, and other data access information. These concepts allow one application to create data, and other applications totally unrelated to the first, to analyze and update the data.

However, with keyed, sequential, and binary file systems, there are several inhibitors that prevent these file systems from having the above flexibility. These include: (1) data is not held in a fixed table format; (2) data access is via a buffer that passes the entire record, with no public or obvious field delineation available; and (3) the structure, or field layout, of keyed, sequential, and binary records is not stored in a publicly available catalog. With these inhibitors, relational operations cannot be performed on the keyed, sequential, and binary file systems, making SQL operations from within a single application across heterogeneous file systems which include these file systems difficult or impossible.

Referential Integrity

Referential integrity is a technique where the consistency of data within a DBMS is ensured by referring to one piece of data during an operation on another piece of data. An example would be to refer to a department table to ensure that a valid department number is being used when a new employee is being added to the database. Referential integrity is incorporated in many of the conventional relational DBMS and is being enforced at the database level to ensure that all applications adhere to any constraints and thus ensure the integrity of the data.

However, the concept of referential integrity, and a file system mechanism to enforce it, does not exist for keyed, sequential, and binary file systems. Without this function, heterogeneous DBMS can not implement referential integrity between the relational and non-relational data. Using the above example, if the valid department list is in a keyed file system and the new employee data was to be stored in a relational database, there would be no way that the underlying data stores could enforce the referential integrity during the employee add operation.

Indices for Queries

A need often arises to access keyed and sequential data based on data selection criteria different from the key or record number traditionally used to access the data. Queries based on this type of selection criteria are referred to as ad-hoc queries. For instance, instead of retrieving an employee record by an employee number there may be a need to retrieve all of the employees who are employed in department "X". The employee records are keyed by an employee identification number yet the selection criteria is based on the department number in which the employee is employed.

For relational databases, ad-hoc queries may be efficiently satisfied since indices of the data may be created for data elements other than the key or record number. Once created; these indices may be used as an alternative form of data access which provides a more efficient processing of the query.

However, to satisfy queries using conventional file access mechanisms available for hash-keyed or sequential files, every record in the file must be read and compared to the selection criteria since indices are not available for these files. This causes performance problems both in accessing the file and in creating the network traffic when the querying application resides on a machine other than the source data files.

Accordingly, there exists a need for a method and system for improved access to non-relational databases in a computer system. The method and system should increase the flexibility and efficiency of access to the databases. The present invention addresses such a need.

SUMMARY OF THE INVENTION

The method and system of the present invention provides improved access to databases in a computer system. The present invention includes a plurality of data sources, the data sources including at least one non-relational data source; a server coupled to the plurality of data sources, the server capable of providing client access to the plurality of data sources; and a store place data access layer (SPDAL) coupled to the server and the at least one non-relational data source, the SPDAL providing relational features to the at least one non-relational data source. In the preferred embodiment, the relational features provided include a two-phase commit process; a process for performing Structured Query Language (SQL) operations from within a single application; a referential integrity process; and a process for providing indices for non-relational data source files. These features allow the computer system to perform data changes across multiple database sources within a single operation; perform SQL operations from a single application across heterogeneous file systems; provide referential integrity of data in both relational and non-relational databases; and perform ad-hoc queries of data and other queries efficiently in non-relational databases. By adding these features, significant flexibility is added to the computer system.

BRIEF DESCRIPTION OF THE DRAWINGS

FIG. 6 is a block diagram illustrating an example of a two-phase commit performed in accordance with the present invention.

FIG. 7 is a preferred embodiment of metadata tables provided for non-relational databases in accordance with the present invention.

FIG. 8 is a flow chart illustrating the referential integrity process provided by the method and system in accordance with the present invention.

FIG. 9 is a block diagram illustrating a preferred embodiment of the Index Manager in accordance with the present invention.

DETAILED DESCRIPTION OF THE INVENTION

The present invention relates to a method and system for providing improved access to non-relational databases in a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
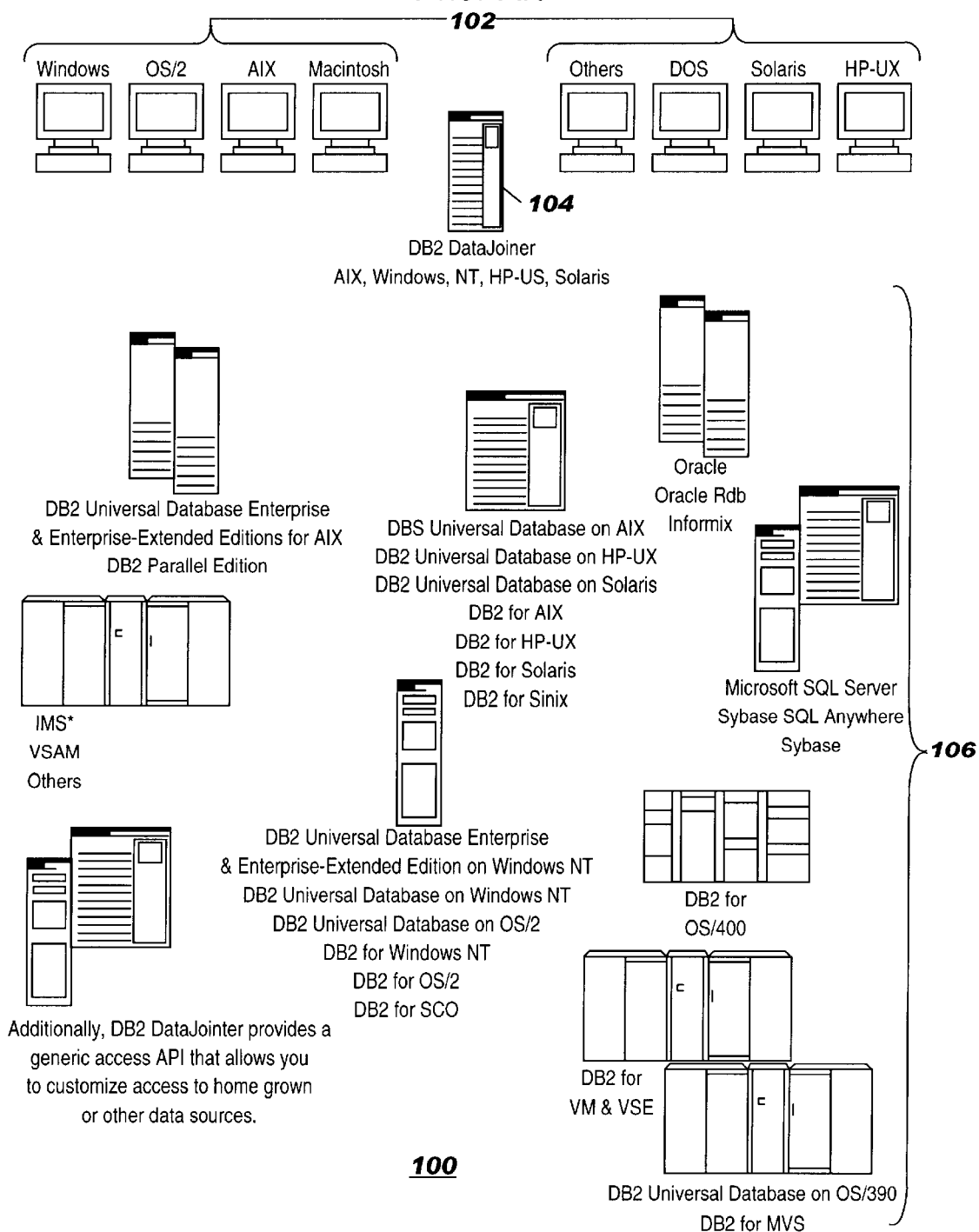
FIG. 1 is a diagram illustrating a computer system which uses DataJoiner.
Figure 2:
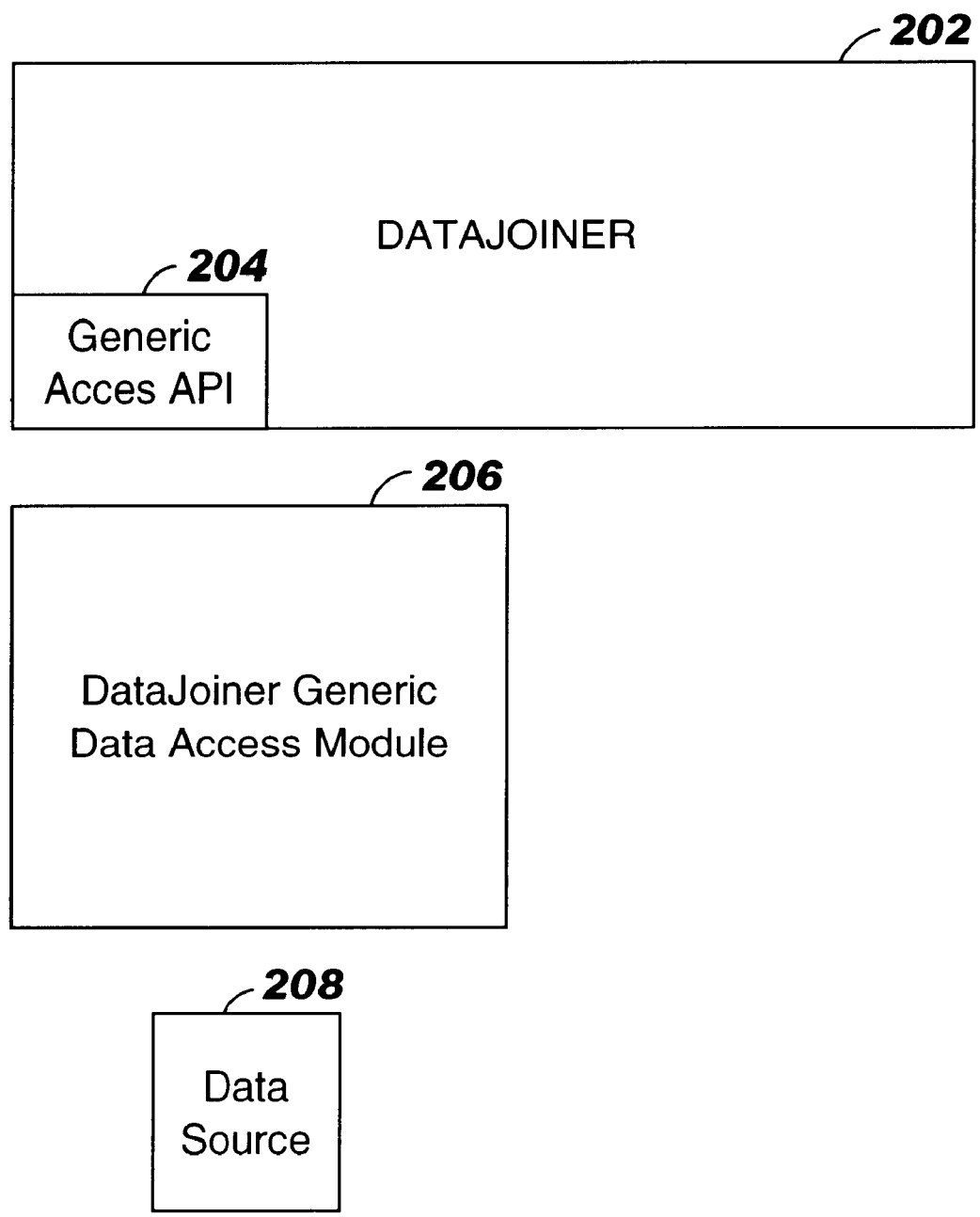
FIG. 2 is a block diagram illustrating the basic architecture of DataJoiner.
Figure 3:
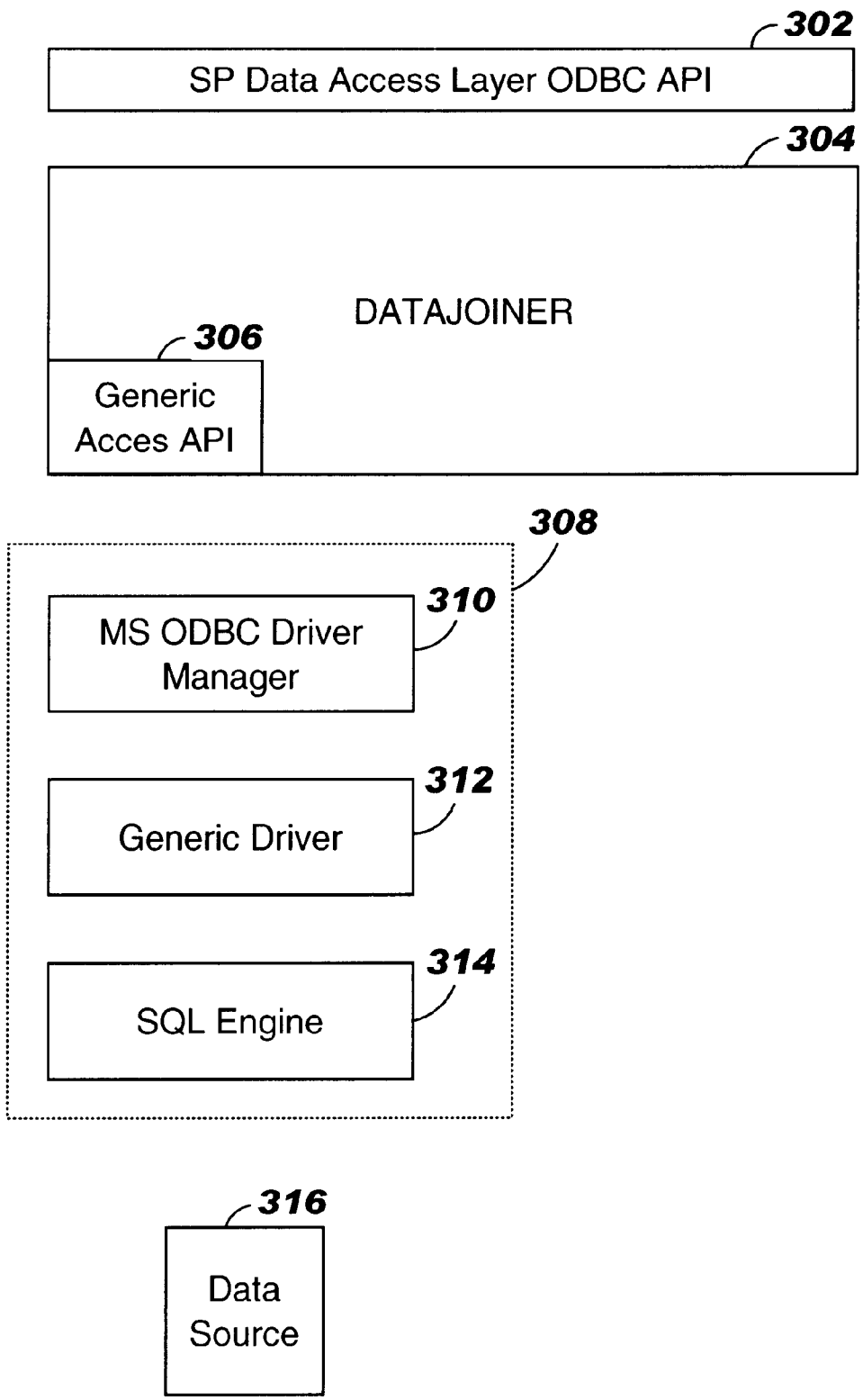
FIG. 3 is a block diagram illustrating a preferred embodiment of the architecture of the method and system in accordance with the present invention.

The present invention provides improved access to non-relational databases through an expansion upon the capabilities of DataJoiner. FIG. 3 is a block diagram illustrating a preferred embodiment of the architecture of the method and system of the present invention. The Store Place Data Access Layer (SPDAL) architecture 300 comprises an Open Database Connectivity Applications Programming Interface 302 (ODBC API) which functions with DataJoiner 304. The SPDAL ODBC API 302 works with the Generic Access API 306 of DataJoiner 304 to provide a single access point for heterogeneous data source manipulations. An ODBC Driver 308 may be created to function with the SPDAL ODBC API 302 to access keyed, sequential, and binary file types, such as a 4690 data source 316. The ODBC Driver 308 comprises an ODBC Driver Manager 310, a Generic Driver 312, and a SQL Engine 314. In the preferred embodiment, the ODBC Driver Manager 310 is an ODBC Driver Manager, known in the art.

SPDAL 300 improves access to non-relational databases by providing the following capabilities: (1) true two-phase commit, (2) performance of SQL operations from within a single application across heterogeneous file systems, (3) referential integrity, and (4) indices for queries.

Two-Phase Commit

A two-phase commit process for keyed, sequential, and binary file systems is provided by the preferred embodiment of the method and system of the present invention. The two-phase commit is provided with an X/OPEN Distributed Transaction Processing (DTP) model using "XA interface" in SPDAL 302. X/OPEN, and its XA interface, is a standard protocol for access to databases.

Figure 4:
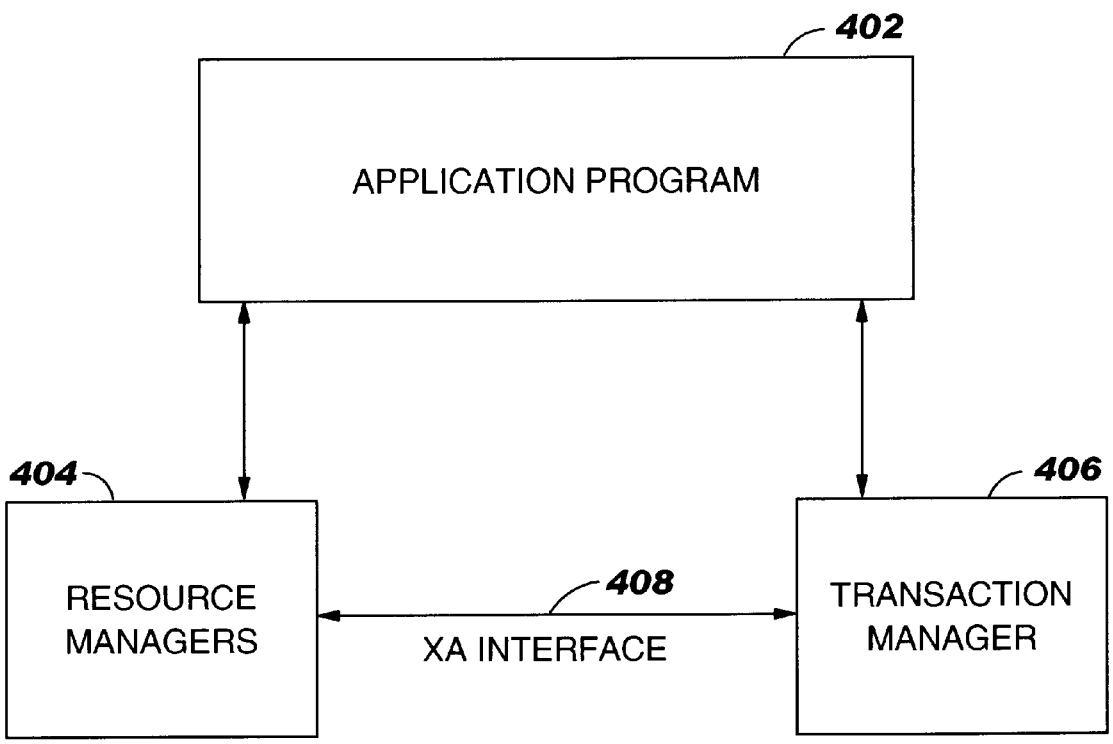
FIG. 4 is a block diagram illustrating the X/OPEN DTP model used in accordance with the present invention.

FIG. 4 is a block diagram illustrating the X/OPEN DTP model used in accordance with the present invention. The X/OPEN DTP model comprises three software components:

An application program 402 which defines transaction boundaries and specifies actions that constitute a transaction.

Resource managers 404 which provide access to shared resources.

A transaction manager 406 which assigns identifiers to transactions, monitors their progress and takes responsibility for transaction completion and for failure recovery.

In the preferred embodiment, the XA Interface 408 is implemented with the X/OPEN DTP model as an intercept layer in the Generic Driver 312. The intercept layer would act as a resource manager for each file system, i.e., it would assume the role of a data source. DataJoiner 304 would act as the transaction manager. This would make the keyed, sequential, or binary file system appear to DataJoiner 304 as a fully functional relational database implementing an XA interface 408. The XA Interface 408 implements XA calls which allow for interaction between the transaction manager/DataJoiner 304 and the data source 316. This two-phase commit protocol provided by the present invention can be used to manage data changes across multiple data base sources within a single operation.

Figure 5:
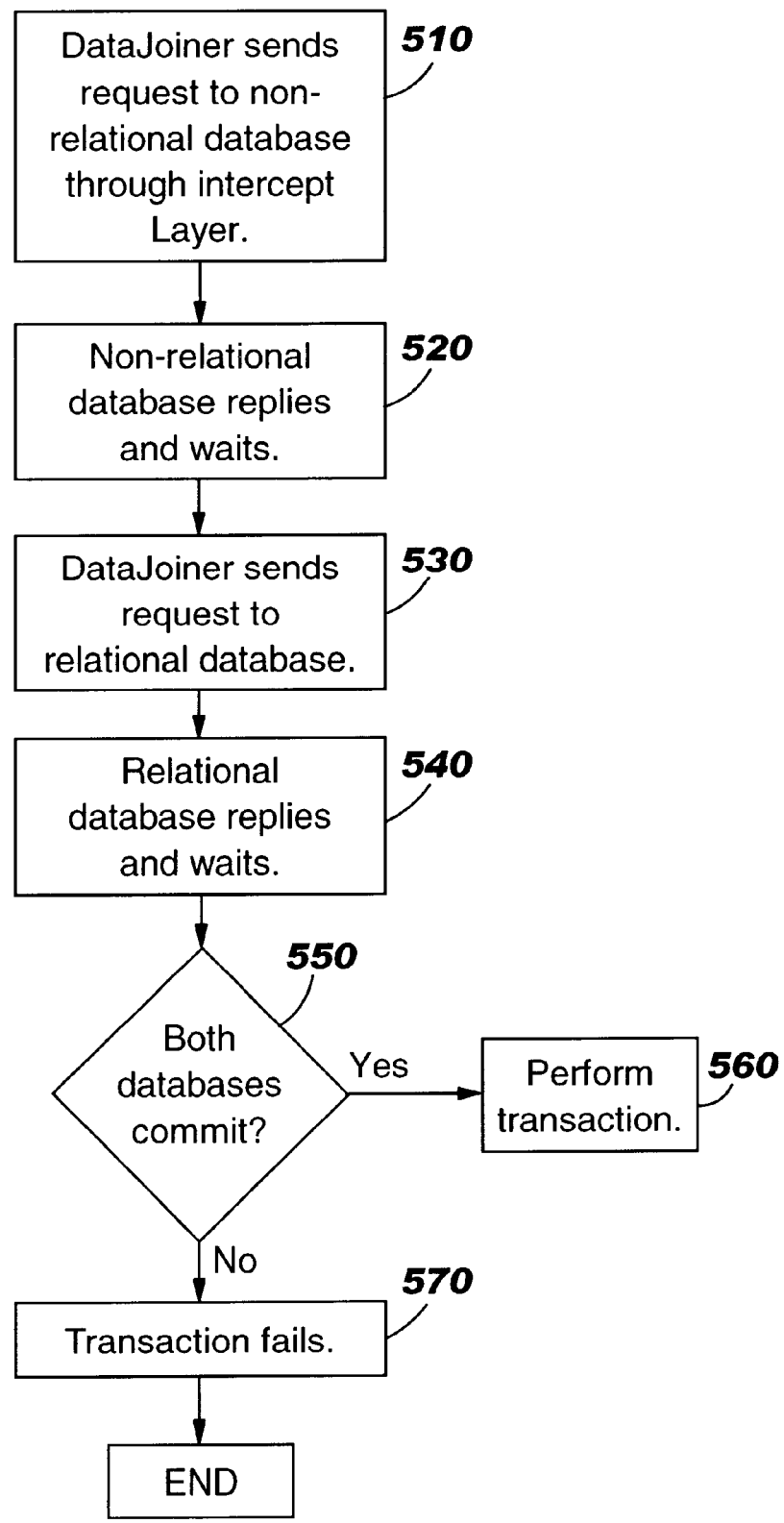
FIG. 5 is a flow chart illustrating the two-phase commit process provided by the method and system in accordance with the present invention.

FIG. 5 is a flow chart illustrating the two-phase commit process provided by the method and system in accordance with the present invention. For this illustration, assume that a first database is a non-relational database and a second database is a relational database and a request requires a two-phase commit between them. First, DataJoiner 304, as the transaction manager, sends a request to the non-relational database, via step 510, through intercept layer in the Generic Driver 312. The intercept layer implements the appropriate XA calls to facilitate interaction between DataJoiner 304 and the non-relational database. The non-relational database replies to the request and waits, via step 520. DataJoiner 304 also sends a request to the relational database, via step 530. The relational database replies to the request and waits, via step 540. If both the non-relational and relational databases commit to the request, via step 550, the request is performed, via step 560. Otherwise, the transaction fails, via step 570.

Examples of functions for each XA API call comprise the below:

xa_close: Frees any dedicated two-phase commit resources.

xa_commit: Unlock the section of the file previously locked, this will make the data changes available to other applications.

xa_complete: Used by the transaction manager to wait for asynchronous operations. Return control to the transaction manager when the operation identified by the handle is complete.

xa_end: Free any dedicated resources acquired during xa_start processing.

xa_forget: Release resources associated with a xid.

xa_open: Initialize any dedicated two-phase commit resources.

xa_prepare: Obtain a write lock on the portion of the keyed, sequential, or binary file that will be changed. By acquiring a write lock, the resource manager intercept layer can guarantee that the subsequent write and commit will occur. The prepared write instruction (location in the file and buffer to write) should be saved in case a rollback is required.

xa_recover: Return to the transaction manager any prepared but not committed transactions.

xa_rollback: Undo the write operation staged with xa_prepare.

xa_start: Initialize any dedicated resources required for a transaction.

FIG. 6 illustrates an example of a two-phase commit performed in accordance with the present invention. In this example, assume that a request is received by DataJoiner to transfer $1000 from a first account at a first bank to a second account in a second bank. The first bank maintains its accounts in a non-relational database 602 (DS1), such as a 4690 data source. The second bank maintains its accounts in a relational database 604 (DS2), such as a DB2 data source. The banks do not want to perform the credit without also performing the debit and vice versa. In completing this transaction, first the transaction manager, DataJoiner 304, sends a request to the 4690 Keyed File, DS1 602, to debit $1000 from the first account, via step 510. The request is sent through the Generic Access API 306 to the Intercept Layer in the Generic Driver 312. The Intercept Layer implements the appropriate XA calls to facilitate the portion of the transaction involving DS1 602. DS1 602 replies to the XA calls and waits, via step 520. DS1's 602 reply is sent to the transaction manager by the Intercept Layer. The transaction manager also sends a request to DS2 604 to credit the second account $1000, via step 530. DS2 604 replies and waits, via step 540. This ends phase one of the two-phase commit process.

If either DS1 602 or DS2 604 indicates that they are unable to make the requested credit/debit, i.e., if either data source fails to commit, via step 550, the transaction fails, via step 570, and the transaction manager moves on to the next transaction. If both DS1 602 and DS2 604 indicate they are able to make the requested credit/debit, i.e., both data sources commit, via step 550, then the credit and debit are performed, via step 560. This ends phase two of the two-phase commit process.

In the above manner, a two-phase commit process is provided by the method and system of the present invention.

SQL Operations from within a Single Application

With the preferred embodiment of the method and system of the present invention, the ability to perform SQL operations from within a single application is provided. The present invention implements this capability by providing additional metadata tables in a database in addition to the metadata tables of DataJoiner 304. These additional metadata tables describe the keyed, sequential, and binary file content such that the files within those file systems can be accessed by the SPDAL ODBC API 302 of the present invention, and manipulate it using relational operations. In addition, the metadata content itself is described and held as a relational table, so that this data is publicly available to all users and applications, and can be used in conjunction with DataJoiner 304 to perform single relational operations across relational data sources and keyed, sequential, and binary file data concurrently.

The metadata information of the present invention is used by DataJoiner 304 via the SPDAL ODBC API 302 to service requests from applications, thus removing the burden of individual applications to code to the specifics of the data's physical design and location.

A summary of the metadata tables of the present invention follows. A more detailed description of fields in the metadata tables are provided in FIG. 7:

LogicalEntity Table: maps a LogicalEntityName to one or more physical entities. (See Table 1, FIG. 7)

PhysicalEntity Table: describes metadata information that is defined for each relational database table or keyed, sequential, and binary file. (See Table 2, FIG. 7)

RecordDescription Table: describes the metadata information for records that exist within keyed, sequential, or binary files. (See Table 3, FIG. 7)

Attribute Table: describes the metadata information for all fields in a keyed, sequential, binary file. The definition of a field provides the physical layout structure that an application would use to process the data within the field. (See Table 4, FIG. 7)

ValidAttributeValuesTable: describes the discrete values that are valid within an attribute. (See Table 5, FIG. 7)

ForeignKey Table: describes the metadata information for parent-child relationships. These relationships are used to enforce referential integrity across all SPDAL data, as will be described in more detail later in this specification. This includes relational databases as well as non-relational databases. Relationships can be established between attributes within the same file system (for example between two relational tables) or between attributes across different file. systems (for example between a relational table and a keyed file). (See Table 6, FIG. 7)

Index Table: describe, set, and maintain indexes on keyed, sequential, binary files. The use of this table will be described in more detail later in this specification. (See Table 7, FIG. 7)

Although the present invention is described with the metadata tables as illustrated in FIG. 7, one of ordinary skill in the art will understand that other access mechanisms for keyed, binary, and sequential file types may be used without. departing from the spirit and scope of the present invention.

When DataJoiner 304 receives a SQL query which involves both a relational and a non-relational data source, Datajoiner 304 "splits" the query. It passes "as is" to the SPDAL ODBC API 302 the portion of the query which deals with the non-relational data source 316, and it passes the other portion to the relational data source through its native ODBC driver. The SQL engine 314 then interprets the SQL query into the low level calls for access to the non-relational data source 316. The requested data is returned in response to these low level calls. This result is then returned to DataJoiner 304, which combines it with the result returned from the relational data source. DataJoiner 304 then returns the combined result to the SQL query.

By providing the metadata in accordance with the present invention, advanced relational concepts, such as referential integrity, can be used across relational database management systems, and keyed, sequential, and binary file systems in the same operation. In addition, the metadata content structure is described as standard relational tables, making the metadata publicly available to any user or application. Finally, the metadata allows for a logical view for access to the underlying keyed or sequential file data. This enables an application to code to a logical model without having to be concerned with the underlying physical data store, or changes to the underlying physical data store.

Referential Integrity

The method and system of the present invention provides for referential integrity across both relational and non-relational databases. In the preferred embodiment, referential integrity is implemented in the SPDAL ODBC API 302 by combining the metadata described above with a relational database engine that can process the results of relational operations from outside data sources to ensure referential integrity across both the relational database and keyed, sequential, and binary file systems. The relational database engine is a SQL engine 314 which has the ability to perform queries which implement referential integrity, as described below.

The metadata is used to describe the referential constraints within the keyed, and binary file systems, and between these file systems and the relational file systems. The metadata is implemented by providing the following information in its ForeignKey Table:

Parent/child relationships between files

Primary key fields

Cardinality between the parent and child

List of fields that comprise a foreign key

Delete rules

Table 6 in FIG. 7 provides in more detail the above listed information.

FIG. 8 is a flowchart illustrating the referential integrity process provided by the method and system of the present invention. In the preferred embodiment, the database access is through ODBC or X/OPEN CLI interfaces. Both are widely accepted and implemented by conventional competitive relational database management systems. First, the SPDAL ODBC API 302 captures an end user query before it is passed to DataJoiner 304, via step 810. The query is preprocessed in the SPDAL ODBC API 302 based on information in the metadata tables, via step 820, specifically, the information in the ForeignKey Table. In the preprocessing, the SPDAL ODBC API 302 determines if the end user query requires any referential integrity processing, via step 822. Is so, the SPDAL ODBC API 302 would formulate the queries to execute and enforce the referential constraints, via step 824. Then, the end user query is passed to DataJoiner 304 for processing, via step 840. DataJoiner 304 determines if the query requires non-relational data, via step 850. If not, DataJoiner processes the query for the relational data, via step 860, and returns the result, via step 870. If so, then the query is processed on the non-relational data source, via step 880. In this processing, the queries which execute and enforce the referential contraint is passed to the SQL Engine 314, via step 826. The SQL Engine 314 translates these queries to commands compatible with the non-relational data source 316, via step 828. The SQL Engine 314 next executes these commands, via step 830. DataJoiner also processes the query for the relational data, via step 860. The results from both the relational and non-relational data sources are returned, via step 870.

The following is a summary of ODBC calls which may be made by the ODBC API 302 to implement referential constraints in accordance with the method and system of the present invention:

DELETE: Use the delete rules specified in the metadata to delete restrict, set null, or cascade. The ODBC driver of the present invention may need to make several calls into the relational DBMS in order to complete the requested action.

INSERT: Issue a SELECT ODBC call on the parent table to ensure that each row conforms to the referential constraint prior to passing the INSERT to the original relational DBMS ODBC driver. If the constraint does not pass, then the ODBC driver of the present invention will generate an error message and return control directly to the application program. From the application's viewpoint, it looks as if the underlying relational DBMS detected the referential constraint violation and returned the error.

UPDATE: Issue a SELECT ODBC call on the parent table to ensure that each row conforms to the referential constraint prior to passing the UPDATE to the original relational DBMS ODBC driver. If the constraint does not pass, then the ODBC driver of the present invention will generate an error message and return control directly to the application program. From the application's viewpoint, it looks as if the underlying relational DBMS detected the referential constraint violation and returned the error.

In this manner, referential integrity is provided within a keyed, sequential, or binary file system in accordance with the method and system of the present invention. The present invention provides dynamic real-time enforcement of the referential integrity constraints, at the data store level, across both relational databases and keyed, sequential, and binary file systems.

Indices for Queries

The method and system of the present invention provides a more efficient performance of queries, including ad-hoc queries, for non-relational databases. The efficiency is increased through the creation of an Index Manager which allows for the creation of indices for hash-keyed and sequential files. The indices are created based on the data selection criteria commonly used to satisfy user-defined ad-hoc queries. The user decides, based on the frequency that the query will be issued, along with the required response time to obtain the result set, which indices should be created.

As illustrated in FIG. 9, the Index Manager 902 is located next to the SQL Engine 314. The Index Manager 902 is accessed by the SQL Engine 314 during the satisfying of an end user query. In the preferred embodiment, the Index Manager comprises the following:

Index Manager API 904: allows users to maintain their indices and access the data contained with in the indices. This interface is available for use by external application programs that require access to the indices.

Index Manager Hash-keyed and Sequential File Interface 906: provides a means of updating indices to reflect additions, updates, and deletions of data from indices when the corresponding source data files change. This interface is context sensitive in that it depends on the file maintenance mechanism available on the data source.

Index Manager B-Tree Function 908: index entries are maintained in a B-Tree structure within the Index Manager to maintain the index entries. B-Tree structures are well known in the art and will not be discussed further here.

Index Manager Support Functions 910: include error logging and audit logging facilities, as well as a means of obtaining information about the data being indexed, i.e., the meta data.

Figure 10:
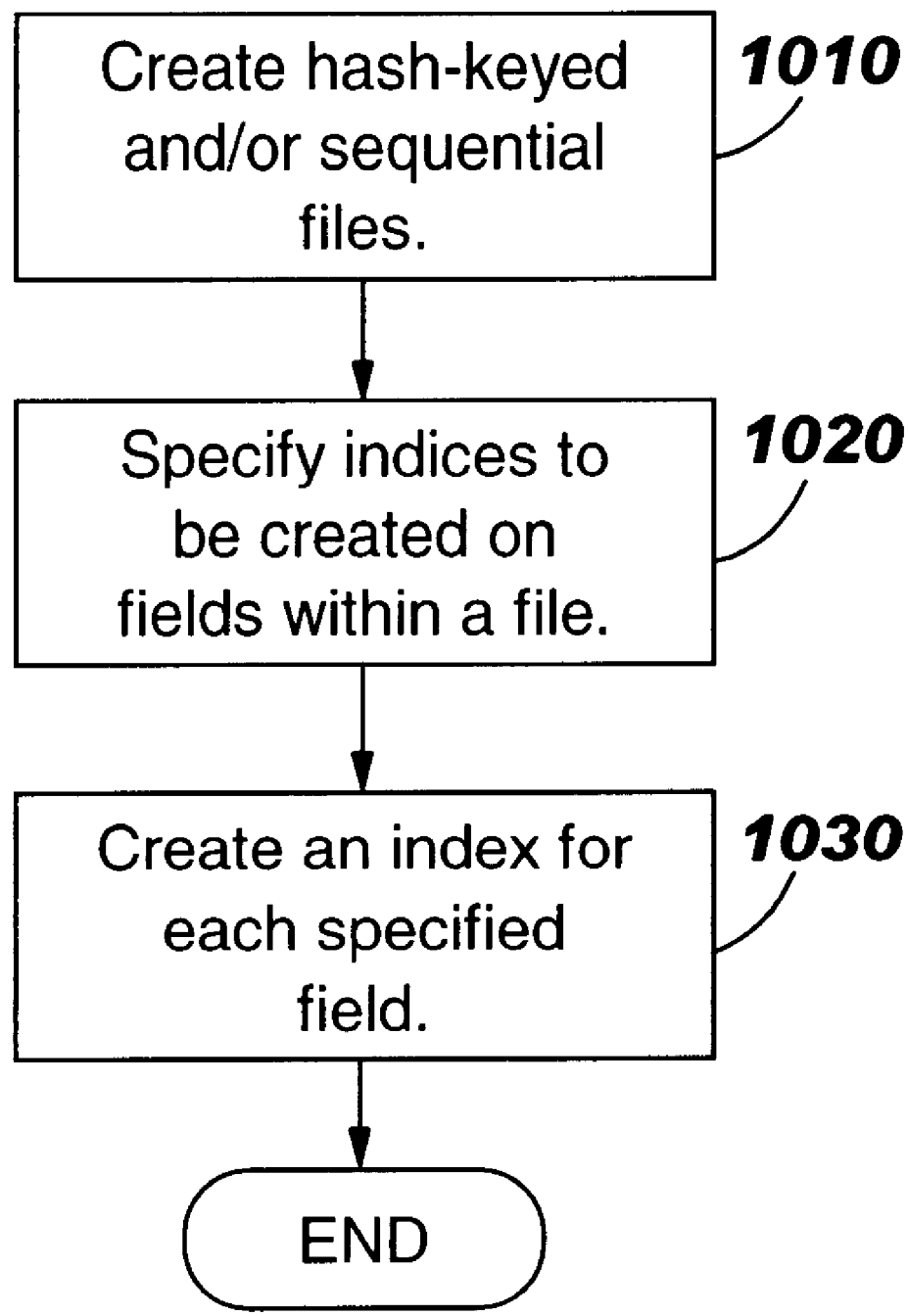
FIG. 10 is a flow chart illustrating the creation of indices by the Index Manager in accordance with the present invention.

FIG. 10 is a flowchart illustrating the creation of indices by the Index Manager 802 in accordance with the present invention. First, hash-keyed and/or sequential files are created, via step 1010. Next, the Index Manager API .904 is used to specify an index or indices to be created on a field or fields within a file, via step 1020. The Index Manager 902 then creates an index on the specified field or fields, via step 1030. This index is kept up to date when changes are occurring in the source data files via the Index Manager Hash-keyed and Sequential File Interface 906.

Figure 11:
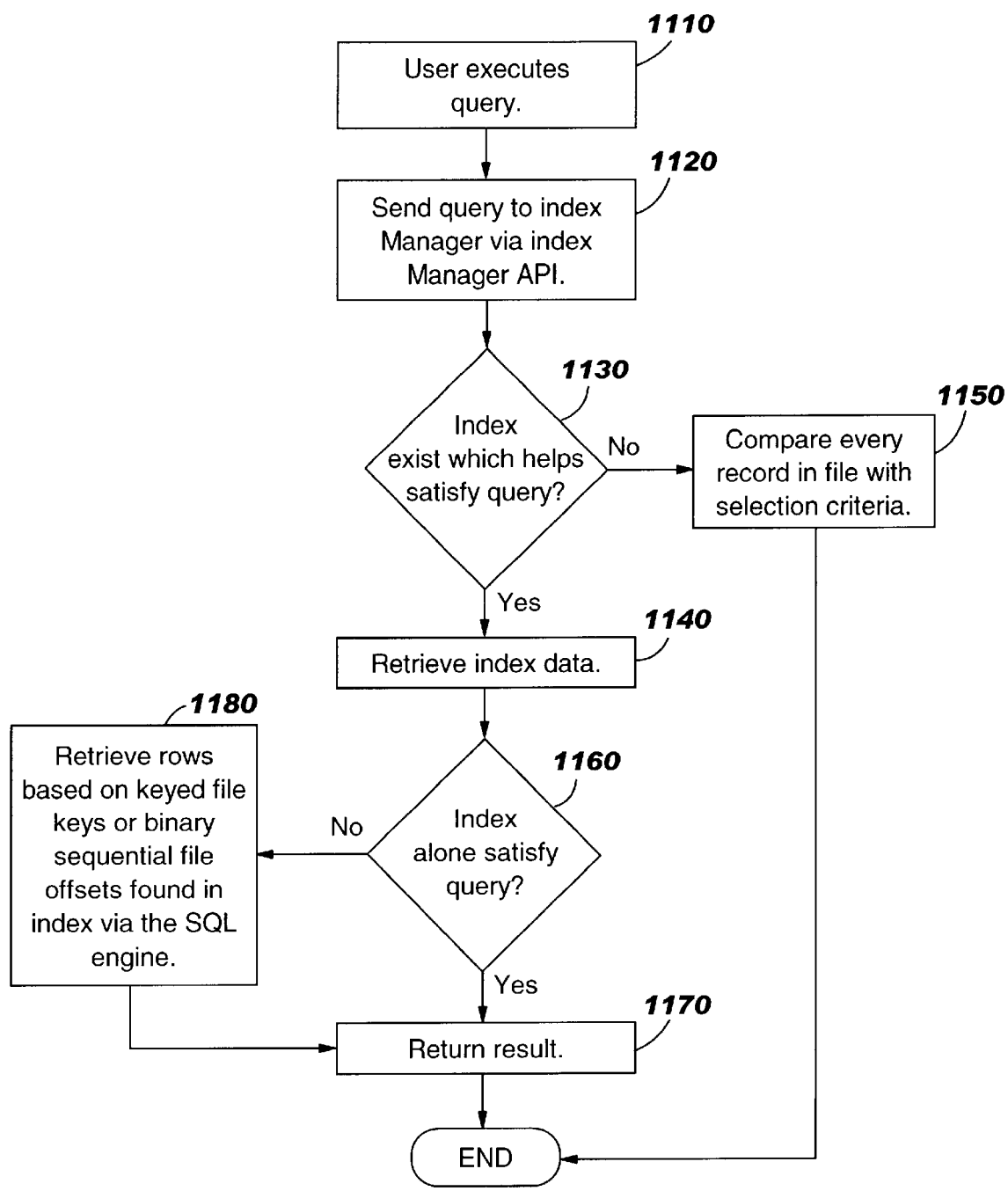
FIG. 11 is a flow chart illustrating the use of the indices in satisfying a user query in accordance with the present invention.

FIG. 11 is a flowchart illustrating the use of the indices in satisfying a user query in accordance with the present invention. When the user executes a query, via step 1110, the query is sent to the SQL Engine 314, via step 1120. The SQL Engine 314 then accesses the Index Manager 902 via the Index Manager API 904 to see whether an index exists that helps satisfy the query, via step 1130. If so, the Index Manager API 904 makes function calls to retrieve the indexed data, via step 1140. If not, then every record in the file needs to be read and compared to the selection criteria, via step 1150. Once the index data is retrieved, the Index Manager 902 determines if the index alone satisfies the query, via step 1160. If it does, then the result of the query is returned to DataJoiner 304 via the SQL Engine 314, via step 1170. If not, the rows based on the keyed file keys or binary sequential file offsets found in the index are also retrieved via the SQL Engine 314, via step 1180. Then the result is returned, via step 1170.

With the Index Manager 902 of the present invention, indexing capabilities are provided to hash-keyed, sequential and binary files. The efficiency in the execution of other queries is also greatly improved. By allowing the query application processing to only retrieve data that is known based on indices to satisfy the user defined query, there will be less network traffic when the application issuing the query resides on a machine other than the one where the source data files are stored. In addition, the cost of disk space to store indices is lowered.

A method and system for improved access to non-relational databases in a computer system has been disclosed. The method and system provides capabilities for a two-phase commit, performance of SQL operations from within a single application across heterogeneous file systems, referential integrity, and indices for ad-hoc and other queries for non-relational databases. These capabilities allow the computer system to perform data changes across multiple database sources within a single operation; perform SQL operations from a single application across heterogeneous file systems; provide referential integrity of data in both relational and non-relational databases; and perform ad-hoc queries of data and other queries efficiently when some or all of the data is stored in non-relational databases. By adding these capabilities, significant flexibility is added to the computer system.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for improved access to databases in a computer system, comprising:

a plurality of data sources, the data sources including at least one non-relational data source and at least one relational data source;

a server coupled to the plurality of data sources, the server capable of providing client access to the plurality of data sources; and a store place data access layer (SPDAL) coupled to the server, the at least one relational data source, and the at least one non-relational data source, the SPDAL providing a single access point for data manipulation concurrently across the at least one non-relational data source and the at least one relational data source, wherein the data manipulation is performed with a single query to the SPDAL.

2. The system of claim 1, wherein the data manipulation comprises:

a two-phase commit process performed concurrently across the at least one non-relational data source and the at least one relational data source with a single operation at the SPDAL;

a process for performing Structured Query Language (SQL) operations concurrently across the at least one non-relational data source and the at least one relational data source from within a single application;

a referential integrity process performed concurrently across the at least one non-relational data source and the at least one relational data source with a single query to the SPDAL; and a process for providing indices for non-relational data source files for use with a single query to the SPDAL for concurrent data manipulation across the at least one non-relational data source and the at least one relational data source.

3. The system of claim 1, wherein the server is a DB2 DataJoiner.

4. The system of claim 3, wherein the DB2 DataJoiner comprises a Generic Access Applications Programming Interface (API) which allows for customized access to data sources not already supported by DataJoiner.

5. The system of claim 1, wherein the SPDAL comprises:

a SPDAL Open Database Connectivity (ODBC) API coupled to the server;

an ODBC Driver Manager coupled to a Generic Access API;

a Generic Driver coupled to the ODBC Driver Manager; and a SQL Engine coupled to the Generic Driver.

6. The system of claim 5, wherein the Generic Driver comprises:

an intercept layer, the intercept layer functioning as a resource manager for the at least one non-relational database during a two-phase commit process.

7. The system of claim 5, further comprising:

an index manager coupled to the SQL Engine, the index manager allowing for the creation of indices for the at least one non-relational data source.

8. The system of claim 7, wherein the index manager comprises:

an index manager API;

a hash-keyed and sequential file interface;

a B-Tree function; and a support function.

9. A system for improved access to databases in a computer system, comprising:

a plurality of data sources, the data sources including at least one non-relational data source;

a server coupled to the plurality of data sources, the server capable of providing client access to the plurality of data sources and at least one relational data source; and a SPDAL coupled to the server, the at least one relational data source, and the at least one non-relational data source, the SPDAL providing a single access point for data manipulation concurrently across the at least one non-relational data source and at least one relational data source, wherein the data manipulation comprises:

a two-phase commit process performed concurrently across the at least one non-relational data source and the at least one relational data source with a single operation at the SPDAL;

a process for performing SQL operations concurrently across the at least one non-relational data source and the at least one relational data source from within a single application;

a referential integrity process performed concurrently across the at least one non-relational data source and the at least one relational data source with a single query to the SPDAL; and a process for providing indices for non-relational data source files for use with a single query to the SPDAL for concurrent data manipulation across the at least one non-relational data source and the at least one relational data source.

10. The system of claim 9, wherein the server is a DB2 DataJoiner.

11. The system of claim 10, wherein the DB2 DataJoiner comprises a Generic Access API which allows for customized access to data sources not already supported by DataJoiner.

12. The system of claim 9, wherein the SPDAL comprises:

a SPDAL ODBC API coupled to the server;

an ODBC Driver Manager coupled to a Generic Access API;

Generic Driver coupled to the ODBC Driver Manager; and a SQL Engine coupled to the Generic Driver.

13. The system of claim 12, wherein the Generic Driver comprises:

an intercept layer, the intercept layer functioning as a resource manager for the at least one non-relational database during a two-phase commit process.

14. The system of claim 12, further comprising:

an index manager coupled to the SQL Engine, the index manager allowing for the creation of indices for the at least one non-relational data source.

15. The system of claim 14, wherein the index manager comprises:

an index manager API;

a hash-keyed and sequential file interface;

a B-Tree function; and a support function.

16. A system for improved access to databases in a computer system, comprising:

a plurality of data sources, the data sources including at least one non-relational data source and at least one relational data source;

a server coupled to the plurality of data sources, the server capable of providing client access to the plurality of data sources; and a SPDAL coupled to the server, the at least one relational data source, and the at least one non-relational data source, the SPDAL providing a single access point for data manipulation concurrently across the at least one non-relational data source and the at least one relational data source, wherein the data manipulation comprises:

a two-phase commit process performed concurrently across the at least one non-relational data source and the at least one relational data source with a single operation at the SPDAL;

a process for performing SQL operations concurrently across the at least one non-relational data source and the at least one relational data source from within a single application;

a referential integrity process performed concurrently across the at least one non-relational data source and the at least one relational data source with a single query to the SPDAL; and a process for providing indices for non-relational data source files for use with a single query to the SPDAL for concurrent data manipulation across the at least one non-relational data source and the at least one relational data source;

wherein the SPDAL comprises:
- a SPDAL ODBC API coupled to the server;
- an ODBC Driver Manager coupled to a Generic Access API;
- a Generic Driver coupled to the ODBC Driver Manager, the Generic Driver comprising an intercept layer, the intercept layer functioning as a resource manager for the at least one non-relational database during the two-phase commit process;
- a SQL Engine coupled to the Generic Driver; and
- an index manager coupled to the SQL Engine, the index manager allowing for the creation of indices for the at least on e non-relational data source.

17. The system of claim 16, wherein the server is a DB2 DataJoiner, the DB2 DataJoiner comprising a Generic Access API which allows for customized access to data sources not already supported by DataJoiner.

18. The system of claim 16, wherein the index manager comprises:
- an index manager API;
- a hash-keyed and sequential file interface;
- a B-Tree function; and
- a support function.

19. A method for performing SQL operations in a computer system, the computer system including a plurality of data sources, the plurality of data sources including at least one non-relational data source and at least one relational data source, comprising the steps of:

(a) providing a plurality of metadata tables, wherein a first metadata table describes a content of the at least one non-relational data source and a second metadata table describes a content of the at least one relational data source; and (b) utilizing the first and second metadata tables to gain concurrent access to the at least one non-relational data source and the at least one relational data source through a single query to a SPDAL, wherein the SPDAL provides a single access point for data manipulation concurrently across the at least one non-relational data source and the at least one relational data source.

20. A computer readable medium with program instructions for performing SQL operations in a computer system, the computer system including a plurality of data sources, the plurality of data sources including at least one non-relational data source and at least one relational data source, program instructions for:

(a) providing a plurality of metadata tables, wherein a first the metadata table describes a content of the at least on e non-relational data source and a second metadata table describes a content of the at least one relational table; and (b) utilizing the first and second metadata tables to gain concurrent access to the at least one non-relational data source and the at least one relational data source through a single query to a SPDAL, wherein the SPDAL provides a single access point for data manipulation concurrently across the at least one non-relational data source and the at least one relational data source.

* * * * *